(12) United States Patent
Ohsawa et al.

(10) Patent No.: US 11,139,464 B2
(45) Date of Patent: Oct. 5, 2021

(54) METHOD OF PRODUCING NEGATIVE ELECTRODE, NEGATIVE ELECTRODE, AND NON-AQUEOUS ELECTROLYTE SECONDARY BATTERY

(71) Applicant: TOYOTA JIDOSHA KABUSHIKI KAISHA, Toyota (JP)

(72) Inventors: Ryosuke Ohsawa, Okazaki (JP); Akira Tsujiko, Miyoshi (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 16/438,788

(22) Filed: Jun. 12, 2019

(65) Prior Publication Data
US 2020/0006747 A1 Jan. 2, 2020

(30) Foreign Application Priority Data

Jun. 27, 2018 (JP) .............................. JP2018-121639

(51) Int. Cl.
*H01M 4/131* (2010.01)
*H01M 4/1391* (2010.01)
*H01M 4/485* (2010.01)
*H01M 10/05* (2010.01)
(Continued)

(52) U.S. Cl.
CPC ......... *H01M 4/131* (2013.01); *H01M 4/1391* (2013.01); *H01M 4/485* (2013.01); *H01M 4/621* (2013.01); *H01M 10/05* (2013.01); *C01B 33/113* (2013.01)

(58) Field of Classification Search
CPC .... H01M 4/131; H01M 4/1391; H01M 4/621; H01M 4/485; H01M 4/622; H01M 4/483; H01M 4/0404; H01M 10/05; H01M 10/052; H01M 2004/027
See application file for complete search history.

(56) References Cited

U.S. PATENT DOCUMENTS

2012/0107685 A1* 5/2012 Tamaki ................. H01M 4/663
429/213
2015/0147658 A1 5/2015 Nakagaki et al.
(Continued)

FOREIGN PATENT DOCUMENTS

| JP | 2014-010890 A | 1/2014 |
| JP | 2017-188319 A | 10/2017 |
| KR | 10-2018-0066070 A | 6/2018 |

*Primary Examiner* — Ula C Ruddock
*Assistant Examiner* — Mary Grace Byram
(74) *Attorney, Agent, or Firm* — Oliff PLC

(57) ABSTRACT

A first silicon oxide material and a second silicon oxide material are prepared. A dispersion is prepared by dispersing the first silicon oxide material in an aqueous carboxymethylcellulose solution. A negative electrode composite material slurry is prepared by dispersing the second silicon oxide material and a binder in the dispersion. A negative electrode is produced by applying the negative electrode composite material slurry to a surface of a negative electrode current collector and then performing drying. The binder includes no carboxymethylcellulose. The first silicon oxide material has not been pre-doped with lithium. The second silicon oxide material has been pre-doped with lithium.

5 Claims, 2 Drawing Sheets

(51) Int. Cl.
*H01M 4/62* (2006.01)
*C01B 33/113* (2006.01)

(56) References Cited

U.S. PATENT DOCUMENTS

2017/0117543 A1* 4/2017 Park ................... H01M 4/364
2018/0261833 A1 9/2018 Hirose et al.

* cited by examiner

METHOD OF PRODUCING NEGATIVE ELECTRODE, NEGATIVE ELECTRODE, AND NON-AQUEOUS ELECTROLYTE SECONDARY BATTERY

This nonprovisional application claims priority to Japanese Patent Application No. 2018-121639 filed on Jun. 27, 2018, with the Japan Patent Office, the entire contents of which are hereby incorporated by reference.

BACKGROUND

Field

The present disclosure relates to a method of producing a negative electrode, a negative electrode, and a non-aqueous electrolyte secondary battery.

Description of the Background Art

Japanese Patent Laying-Open No. 2017-188319 discloses preliminary doping of a silicon oxide material with lithium (Li).

SUMMARY

As a negative electrode active material for use in a non-aqueous electrolyte secondary battery (which is also simply called "battery" hereinafter), silicon oxide material has been investigated. Compared to graphite, which is a conventional negative electrode active material, silicon oxide material may have a high specific capacity (unit, mAh/g). However, silicon oxide material tends to have a great level of irreversible capacity loss in initial charge and discharge.

Preliminary doping of a silicon oxide material with Li has been proposed, which is called Li pre-doping. Li pre-doping may decrease irreversible capacity loss and increase initial capacity (namely, initial discharged capacity).

Hereinafter, a silicon oxide material not having been pre-doped with Li may be called "undoped $SiO_x$", and a silicon oxide material having been pre-doped with Li may be called "Li-doped $SiO_x$".

A negative electrode of a battery is produced by applying a negative electrode composite material slurry to a surface of a negative electrode current collector. From the viewpoint of reducing impact on the environment, for example, it is desirable to use water as solvent in a negative electrode composite material slurry.

A typical aqueous slurry contains carboxymethylcellulose (CMC) as a dispersion stabilizer. Although CMC may also function as a binder, the binding force of CMC is weak and therefore CMC is concurrently used with another binder having a strong binding force. Hereinafter, a "binder" does not include CMC unless otherwise indicated.

Li-doped $SiO_x$ in water tends to be alkaline. When CMC comes into contact with Li-doped $SiO_x$ during aqueous slurry preparation, the CMC may be modified into alkali-modified CMC. The alkali-modified CMC may be deposited on a surface of Li-doped $SiO_x$. The alkali-modified CMC may interfere with the binding action of a binder. As a result, cycling performance of the resulting battery may decrease.

An object of the present disclosure is to increase initial capacity of a non-aqueous electrolyte secondary battery that includes a silicon oxide material as a negative electrode active material, while mitigating a decrease in cycling performance.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] By a method of producing a negative electrode according to the present disclosure, a negative electrode for a non-aqueous electrolyte secondary battery is produced. The method of producing a negative electrode according to the present disclosure includes at least the following (a) to (d):

(a) preparing a first silicon oxide material and a second silicon oxide material;

(b) preparing a dispersion by dispersing the first silicon oxide material in an aqueous carboxymethylcellulose solution;

(c) preparing a negative electrode composite material slurry by dispersing the second silicon oxide material and a binder in the dispersion; and (d) producing a negative electrode by applying the negative electrode composite material slurry to a surface of a negative electrode current collector and then performing drying.

The binder includes no carboxymethylcellulose. The first silicon oxide material has not been pre-doped with lithium. The second silicon oxide material has been pre-doped with lithium.

In the method of producing a negative electrode according to the present disclosure, the first silicon oxide material is undoped $SiO_x$ and the second silicon oxide material is Li-doped $SiO_x$. Irreversible capacity loss of Li-doped $SiO_x$ may be small compared to that of undoped $SiO_x$. Therefore, concurrently using Li-doped $SiO_x$ with undoped $SiO_x$ may increase initial capacity compared to using undoped $SiO_x$ alone.

In the method of producing a negative electrode according to the present disclosure, undoped $SiO_x$ and CMC come into contact with each other in (b) above. This may cause at least part of CMC to adhere to a surface of undoped $SiO_x$.

Then, in (c) above, Li-doped $SiO_x$ is added. Because at least part of CMC has been adhered to a surface of undoped $SiO_x$, contact of CMC with Li-doped $SiO_x$ may be mitigated; in other words, formation of alkali-modified CMC may be mitigated. This may allow a binder to exhibit a desired level of binding force; in other words, a decrease in cycling performance may be mitigated.

For these reasons, the method of producing a negative electrode according to the present disclosure may increase initial capacity of a non-aqueous electrolyte secondary battery that includes a silicon oxide material as a negative electrode active material while mitigating a decrease in cycling performance.

[2] The first silicon oxide material may include no $Li_2Si_2O_5$ phase, and the second silicon oxide material may include a $Li_2Si_2O_5$ phase.

Discrimination between undoped $SiO_x$ and Li-doped $SiO_x$ may be carried out by checking the presence of a $Li_2Si_2O_5$ phase, for example.

Doping a silicon oxide material with Li may cause formation of a $Li_2Si_2O_5$ phase, a $Li_4SiO_4$ phase, a $Li_2SiO_3$ phase, and the like within the silicon oxide material. In other words, Li-doped $SiO_x$ may include a $Li_2Si_2O_5$ phase. As for Undoped $SiO_x$, on the other hand, although a $Li_4SiO_4$ phase and/or the like may be formed within undoped $SiO_x$ upon reaction with Li during initial charge, no $Li_2Si_2O_5$ phase may be formed within undoped $SiO_x$ during charge-discharge reaction. Therefore, checking the presence of a Li₂Si₂O₅ phase enables discrimination between undoped SiO$_x$ and Li-doped SiO$_x$. Detection of a Li₂Si₂O₅ phase may be carried out by X-ray diffraction (XRD), for example.

[3] The binder may include styrene-butadiene rubber (SBR), for example. SBR is suitable for use in an aqueous slurry and may have a desired level of binding force.

[4] The ratio of the second silicon oxide material to the total of the first silicon oxide material and the second silicon oxide material may be not lower than 10 mass % and not higher than 50 mass %. This may increase initial capacity and improve cycling performance.

[5] A negative electrode according to the present disclosure is a negative electrode for a non-aqueous electrolyte secondary battery. The negative electrode includes at least a negative electrode current collector and a negative electrode composite material. The negative electrode composite material is disposed on a surface of the negative electrode current collector. The negative electrode composite material includes at least a first silicon oxide material, a second silicon oxide material, carboxymethylcellulose, and styrene-butadiene rubber. The first silicon oxide material has not been pre-doped with lithium. The second silicon oxide material has been pre-doped with lithium.

A thermogravimetric curve attributed to the negative electrode composite material satisfies the relation expressed by the following expression (I):

$$w_2/(w_1+w_2) \geq 0.9 \quad (I)$$

where $w_1$ denotes a weight decrement on the thermogravimetric curve across a range of 180° C. to 230° C. and $w_2$ denotes a weight decrement on the thermogravimetric curve across a range of 250° C. to 300° C.

The negative electrode according to the present disclosure includes the first silicon oxide material (undoped SiO$_x$) and the second silicon oxide material (Li-doped SiO$_x$) in combination. Concurrently using Li-doped SiO$_x$ and undoped SiO$_x$ may increase initial capacity compared to using undoped SiO$_x$ alone.

The negative electrode composite material according to the present disclosure gives a characteristic thermogravimetric (TG) curve. The weight decrement on the TG curve across a range of 180° C. to 230° C., which is $w_1$, may be attributed to alkali-modified CMC, and the weight decrement on the TG curve across a range of 250° C. to 300° C., which is $w_2$, may be attributed to unmodified CMC. Therefore, the left side of the above expression (I), namely $w_2/(w_1+w_2)$, may represent the proportion of unmodified CMC in the total CMC in the negative electrode composite material. In the configuration in which unmodified CMC accounts for 90% or more of the total CMC in the negative electrode, a binder (SBR) may exhibit a desired level of binding force; in other words, a decrease in cycling performance may be mitigated.

[6] The first silicon oxide material may include no Li₂Si₂O₅ phase, and the second silicon oxide material may include a Li₂Si₂O₅ phase.

[7] The ratio of the second silicon oxide material to the total of the first silicon oxide material and the second silicon oxide material may be not lower than 10 mass % and not higher than 50 mass %.

[8] A non-aqueous electrolyte secondary battery according to the present disclosure includes at least the negative electrode according to any one of [5] to [7] above. The non-aqueous electrolyte secondary battery according to the present disclosure may have a high initial capacity as well as a good cycling performance.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The description below does not limit the scope of claims.

<Method of Producing Negative Electrode>

According to a method of producing a negative electrode according to the present embodiment, a negative electrode for a non-aqueous electrolyte secondary battery is produced. The non-aqueous electrolyte secondary battery is described below in detail.

Figure 1:
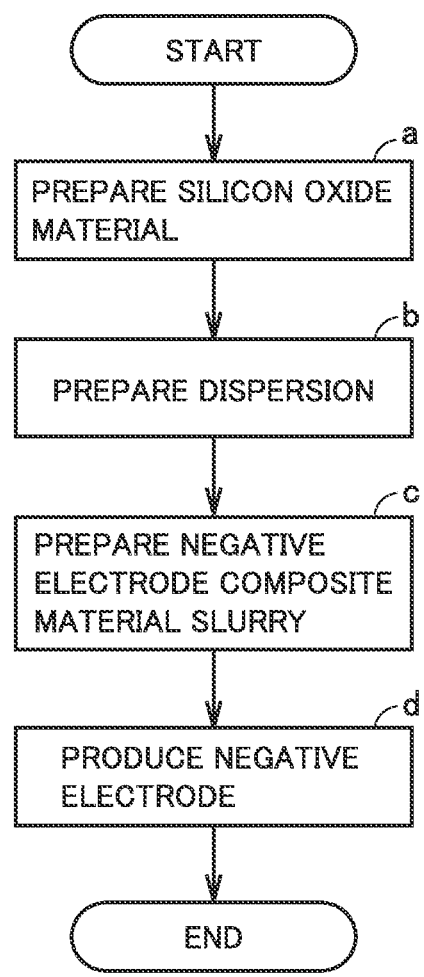
FIG. 1 is a flowchart schematically illustrating a method of producing a negative electrode according to the present embodiment.

FIG. 1 is a flowchart schematically illustrating a method of producing a negative electrode according to the present embodiment.

The method of producing a negative electrode according to the present embodiment includes at least "(a) preparing a silicon oxide material", "(b) preparing a dispersion", "(c) preparing a negative electrode composite material slurry", and "(d) producing a negative electrode".

<<(a) Preparing Silicon Oxide Material>>

The method of producing a negative electrode according to the present embodiment includes preparing a first silicon oxide material and a second silicon oxide material.

Each of the silicon oxide materials serves as a negative electrode active material. Each silicon oxide material may have a high specific capacity compared to graphite. Each silicon oxide material is typically in powder form, namely particles. Each silicon oxide material may have a D50 not lower than 0.1 μm and not higher than 50 μm, for example. The "D50" refers to the particle size in volume-based particle size distribution at which the cumulative particle volume (accumulated from the side of small sizes) reaches 50% of the total particle volume. The D50 may be measured with a laser-diffraction particle size distribution analyzer, for example. Each silicon oxide material may have a D50 not lower than 1 μm and not higher than 10 μm, for example.

Each silicon oxide material is a compound containing silicon (Si) and oxygen (O) as essential components.

Each silicon oxide material may be represented by the following formula (II), for example:

$$SiO_x \quad (II)$$

where x satisfies 0<x<2.

In the above formula (II), x denotes the ratio of the concentration of O atoms to the concentration of Si atoms. x may be measured by Auger electron spectrometry, glow discharge mass spectrometry, or inductively coupled plasma atomic emission spectrometry, for example. Measurement of x may be carried out at least three times. The arithmetic mean of these at least three measurements may be used.

In the above formula (II), x may satisfy $0.5 \leq x \leq 1.5$, for example, and x may satisfy $0.8 \leq x \leq 1.2$, for example. Each silicon oxide material may be a compound consisting essentially of Si and O. Each silicon oxide material may further contain a trace amount of an element other than Si or O. The "trace amount" refers to an amount of 1 mol % or lower, for example. The element contained in a trace amount may be, for example, an element that is inevitably entrapped during synthesis of the silicon oxide material.

(First Silicon Oxide Material)

The first silicon oxide material has not been pre-doped with Li. In other words, the first silicon oxide material is undoped $SiO_x$. For example, preparation of the first silicon oxide material may be carried out by purchasing a commercially available undoped $SiO_x$. For example, preparation of the first silicon oxide material may be carried out by synthesizing undoped $SiO_x$.

Checking whether each silicon oxide material is undoped $SiO_x$ may be carried out by solid-state nuclear magnetic resonance (NMR) spectrometry, for example. More specifically, undoped $SiO_x$ gives signals at both a chemical shift of "−110 ppm to −120 ppm" and a chemical shift of "−90 to −80 ppm" in a $^{29}$Si-MAS-NMR spectrum obtained by magic angle spinning (MAS). Undoped $SiO_x$ may consist essentially of a $SiO_x$ phase. Part of undoped $SiO_x$ may include a Si phase, for example.

(Second Silicon Oxide Material)

The second silicon oxide material has been pre-doped with Li. In other words, the second silicon oxide material is Li-doped $SiO_x$. Li-doped SiO may have a small irreversible capacity loss compared to undoped $SiO_x$. Concurrently using Li-doped SiO and undoped SiO may increase initial capacity compared to using undoped SiO alone.

For example, preparation of the second silicon oxide material may be carried out by purchasing a commercially available Li-doped $SiO_x$. For example, preparation of the second silicon oxide material may be carried out by pre-doping undoped SiO with Li.

The method of pre-doping is not particularly limited. For example, pre-doping may be carried out by the method described below. Undoped SiO powder or the like and Li material powder are prepared. The Li material may be lithium hydride (LiH), for example. The undoped SiO and the Li material are mixed together to prepare a mixture. The resulting mixture is heated at about 1000° C. for about 60 minutes in, for example, an argon (Ar) atmosphere. By this, pre-doping of undoped SiO with Li may be achieved; in other words, Li-doped SiO may be produced. The resulting Li-doped SiO may be rinsed with an inorganic acid (such as hydrochloric acid), for example. The rinsing may reduce the amount of impurities, for example.

The Li-doped SiO obtained by the pre-doping may include various lithium silicate phases. Li-doped SiO may include a $Li_2Si_2O_5$ phase, for example. On the other hand, undoped SiO may include no $Li_2Si_2O_5$ phase. In other words, in the present embodiment, the first silicon oxide material may include no $Li_2Si_2O_5$ phase and the second silicon oxide material may include a $Li_2Si_2O_5$ phase. The second silicon oxide material may further include a SiO phase, a Si phase, a $Li_4SiO_4$ phase, a $Li_2SiO_3$ phase, and the like, in addition to a $Li_2Si_2O_5$ phase.

(XRD)

The presence of a $Li_2Si_2O_5$ phase may be checked by using a powder XRD chart, for example. A diffraction chart of a silicon oxide material including a $Li_2Si_2O_5$ phase may have the following characteristics: a ratio P1/P2, which is the ratio of the height P1 of the peak appearing at a diffraction angle 2θ from 24.5 to 25.0° to the height P2 of the peak appearing at a diffraction angle 2θ from 45 to 50° is 0.1 or higher.

The peak appearing at a diffraction angle 2θ from 45 to 50° may be attributed to a Si phase. The peak appearing at a diffraction angle 2θ from 24.5 to 25.0° may be attributed to a $Li_2Si_2O_5$ phase. If the peak height ratio P1/P2 is 0.1 or higher, the silicon oxide material may include a $Li_2Si_2O_5$ phase. If the peak height ratio P1/P2 is lower than 0.1, the silicon oxide material may include essentially no $Li_2Si_2O_5$ phase.

The measurement conditions for the powder XRD may be as follows, for example:

Measurement temperature: room temperature (20° C.±5° C.)

Monochromator: single crystal graphite

Counter: scintillation counter

X-ray source: Cu-Kα ray (wavelength, 1.54051 Å)

Tube voltage: 50 kV

Tube current: 300 mA

Measurement range: 2θ=10° to 90°

Scanning speed: 10°/min

Step width: 0.02°

(Ratio of Second Silicon Oxide Material)

Preparation of the first silicon oxide material and the second silicon oxide material may be carried out in such a way that the ratio of the second silicon oxide material to the total of the first silicon oxide material and the second silicon oxide material is not lower than 10 mass % and not higher than 90 mass %, for example. Preparation of the first silicon oxide material and the second silicon oxide material may be carried out in such a way that the ratio of the second silicon oxide material to the total of the first silicon oxide material and the second silicon oxide material is not lower than 10 mass % and not higher than 50 mass %, for example. This may increase initial capacity and improve cycling performance.

<<(b) Preparing Dispersion>>

The method of producing a negative electrode according to the present embodiment includes preparing a dispersion by dispersing the first silicon oxide material in an aqueous CMC solution.

(Dispersion)

A dispersion is prepared by dispersing the first silicon oxide material in an aqueous CMC solution. The dispersing may be carried out with a typical stirrer and/or a typical dispersing apparatus (such as a homogenizing disperser or a planetary mixer). The first silicon oxide material (undoped $SiO_x$) is described above in detail. During the process of the first silicon oxide material being dispersed in the aqueous CMC solution, at least part of CMC may become adhered to a surface of the first silicon oxide material.

(Aqueous CMC Solution)

The aqueous CMC solution is prepared by, for example, dissolving CMC powder in water (such as ion-exchanged water). The dissolving may be carried out with a typical stirrer and/or a typical dispersing apparatus, for example. Desirably, the entire amount of CMC is dissolved in water. Alternatively, part of CMC may remain undissolved and be suspended in the aqueous CMC solution. In other words, it is simply required that at least part of CMC be dissolved in water.

The concentration of the aqueous CMC solution is not particularly limited. The concentration of the aqueous CMC solution may be about 0.1 to 2 mass %, for example. For instance, the concentration of the aqueous CMC solution may be decided so as to achieve a CMC content not lower than 0.1 part by mass and not higher than 5 parts by mass relative to 100 parts by mass of the negative electrode active material (namely, the total of the first silicon oxide material, the second silicon oxide material, and an additional negative electrode active material (which is described below)). For example, the concentration of the aqueous CMC solution may be decided so as to achieve a CMC content not lower than 0.5 part by mass and not higher than 1.5 parts by mass relative to 100 parts by mass of the negative electrode active material.

The CMC according to the present embodiment includes a CMC metal salt (such as a sodium salt). The weight average molecular weight of the CMC may be not lower than 10,000 and not higher than 500,000, for example. The weight average molecular weight of the CMC may be not lower than 50,000 and not higher than 200,000, for example. The weight average molecular weight may be measured by size exclusion chromatography (SEC), for example.

(Conductive Material)

The dispersion may be prepared in such a way that it further contains a conductive material. The conductive material may be dispersed in the aqueous CMC solution before the first silicon oxide material is dispersed therein. The conductive material may be dispersed in the dispersion after the first silicon oxide material is dispersed therein. The conductive material is not particularly limited. The conductive material may be carbon black (such as acetylene black (AB) and Ketjenblack (KB, registered trademark)), graphene flakes, and/or carbon nanotubes, for example. One type of the conductive material may be used. Two or more types of the conductive material may be used in combination. The amount of the conductive material used may be, for example, not lower than 1 part by mass and not higher than 10 parts by mass relative to 100 parts by mass of the negative electrode active material.

After the first silicon oxide material and the conductive material are dispersed, water may be further added to the resulting dispersion. In other words, the dispersion may be diluted.

<<(c) Preparing Negative Electrode Composite Material Slurry>>

The method of producing a negative electrode according to the present embodiment includes preparing a negative electrode composite material slurry by dispersing the second silicon oxide material and a binder in the dispersion.

(Negative Electrode Composite Material Slurry)

In the dispersion obtained in "(b) preparing a dispersion" above, the second silicon oxide material and a binder are dispersed to prepare a negative electrode composite material slurry. The dispersing may be carried out with a typical stirrer and/or a typical dispersing apparatus. The second silicon oxide material (Li-doped $SiO_x$) is described above in detail. In the present embodiment, because at least part of CMC is adhered to a surface of the first silicon oxide material while the second silicon oxide material is being added, contact between the second silicon oxide material and CMC may be mitigated.

The second silicon oxide material and the binder may be added to the dispersion sequentially. The second silicon oxide material may be added to the dispersion before the binder is added. The binder may be added to the dispersion after the second silicon oxide material is added. The second silicon oxide material and the binder may be added to the dispersion simultaneously. Dispersing operation may be carried out every time a material is added. Dispersing operation may be carried out after all the materials are sequentially added. Water may be further added thereto for viscosity adjustment and the like.

(Binder)

The binder according to the present embodiment includes no CMC. In other words, the binder according to the present embodiment is a material except CMC. The binder may be in powder form, for example. The binder may be in liquid form, for example. The binder may be SBR, polyacrylic acid (PAA), polyacrylic acid ester, and/or polytetrafluoroethylene (PTFE), for example. One type of the binder may be used. Two or more types of the binder may be used in combination. In other words, the binder may include SBR. The amount of the binder used may be, for example, not lower than 1 part by mass and not higher than 10 parts by mass relative to 100 parts by mass of the negative electrode active material. The amount of the binder used may be, for example, not lower than 4 parts by mass and not higher than 6 parts by mass relative to 100 parts by mass of the negative electrode active material.

(Additional Negative Electrode Active Material)

The negative electrode composite material slurry may be prepared in such a way that it further includes a negative electrode active material other than the silicon oxide material (hereinafter, this negative electrode active material is also called "additional negative electrode active material"). Examples of the additional negative electrode active material may include graphite, soft carbon, hard carbon, silicon, tin, tin oxide, and lithium titanium oxide. One type of the additional negative electrode active material may be used. Two or more types of the additional negative electrode active material may be used in combination. The additional negative electrode active material may be added at any timing. In other words, the additional negative electrode active material may be added to at least one selected from the group consisting of the aqueous CMC solution, the dispersion, and the negative electrode composite material slurry.

The amount of the silicon oxide material (namely, the total of the first silicon oxide material and the second silicon oxide material) and the amount of the additional negative electrode active material may satisfy the following relation, for example:

(silicon oxide material):(additional negative electrode active material)=5:95 to 95:5 (mass ratio).

The amount of the silicon oxide material and the amount of the additional negative electrode active material may satisfy the following relation, for example:

(silicon oxide material):(additional negative electrode active material)=5:95 to 50:50 (mass ratio).

<<(d) Producing Negative Electrode>>

The method of producing a negative electrode according to the present embodiment includes producing a negative electrode by applying the negative electrode composite material slurry to a surface of a negative electrode current collector and then performing drying.

The applying may be carried out with a typical applicator (such as a die coater or a gravure coater). The drying may be carried out with a typical dryer (such as a hot-air dryer or an infrared dryer). The negative electrode current collector is not particularly limited. The negative electrode current collector may be a copper (Cu) foil, for example. The negative electrode current collector may have a thickness not smaller than 5 μm and not greater than 50 μm, for example. To a surface of the negative electrode current collector, the negative electrode composite material slurry is applied, followed by drying, and thus a negative electrode composite material is disposed on a surface of the negative electrode current collector. The negative electrode composite material may be disposed on one side of the negative electrode current collector. The negative electrode composite material may be disposed on both sides of the negative electrode current collector. The negative electrode composite material may form a layer on a surface of the negative electrode current collector.

The negative electrode may be rolled into a predetermined thickness so as to meet the specifications of the battery. The negative electrode may be cut into predetermined planar dimensions so as to meet the specifications of the battery.

In this way, the negative electrode according to the present embodiment may be produced.

<Non-Aqueous Electrolyte Secondary Battery>

Figure 2:
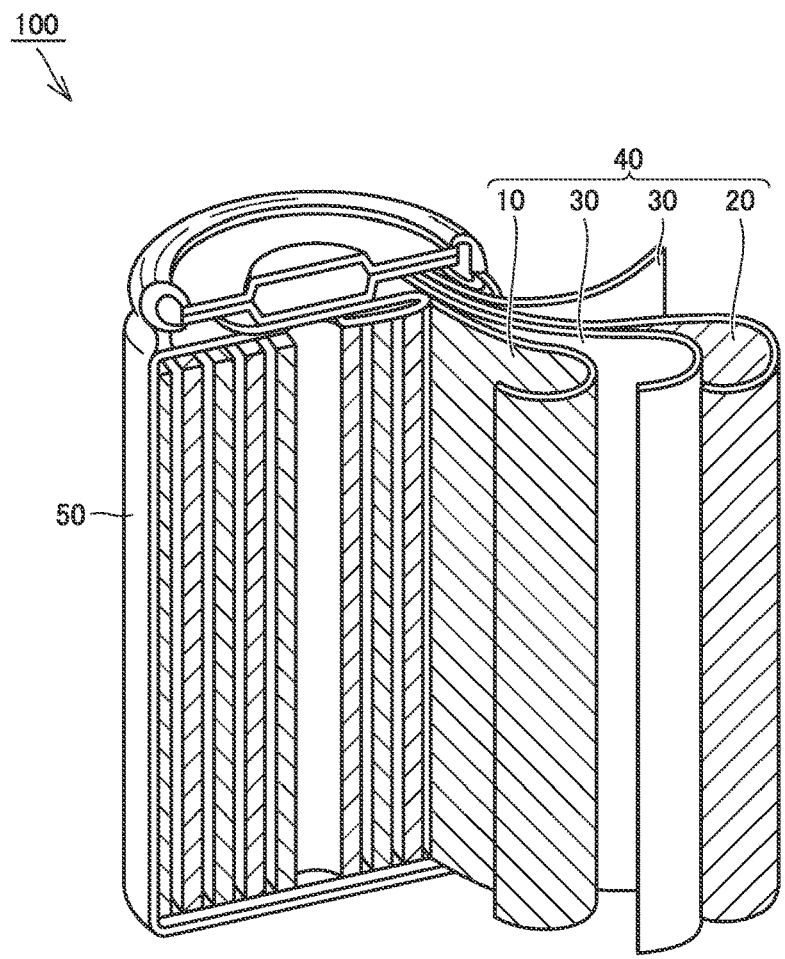
FIG. 2 is a schematic view illustrating the structure of a non-aqueous electrolyte secondary battery according to the present embodiment.

FIG. 2 is a schematic view illustrating the structure of a non-aqueous electrolyte secondary battery according to the present embodiment.

A battery 100 is a non-aqueous electrolyte secondary battery. Battery 100 includes a casing 50. Casing 50 is cylindrical. However, the shape of casing 50 is not limited to cylindrical. Casing 50 may be prismatic.

Casing 50 is hermetically sealed. Casing 50 may be made of resin, iron (Fe), stainless steel, aluminum (Al), and/or Al alloy, for example. Casing 50 may be, for example, a pouch made of an aluminum-laminated film. In other words, battery 100 may be a laminate-type battery. Casing 50 may be equipped with a current interrupt device (CID), a gas-discharge valve, and a liquid inlet, for example.

Casing 50 accommodates an electrode array 40 and an electrolyte solution (not shown). Electrode array 40 includes a positive electrode 10, a negative electrode 20, and a separator 30. In other words, battery 100 includes at least negative electrode 20. Electrode array 40 is a wound-type one. Electrode array 40 is formed by stacking positive electrode 10, separator 30, negative electrode 20, and separator 30 in this order and then winding them in a spiral fashion.

Electrode array 40 may be a stack-type one. More specifically, electrode array 40 may be formed by alternately stacking one positive electrode 10 and one negative electrode 20 and then repeating this alternate stacking process more than once. In each space between positive electrode 10 and negative electrode 20, separator 30 is interposed.

<<Negative Electrode>>

Negative electrode 20 is in sheet form. Negative electrode 20 includes at least a negative electrode current collector and a negative electrode composite material. The negative electrode current collector is described above in detail.

(Negative Electrode Composite Material)

A negative electrode composite material is disposed on a surface of the negative electrode current collector. The negative electrode composite material may be disposed on one side of the negative electrode current collector. The negative electrode composite material may be disposed on both sides of the negative electrode current collector. The negative electrode composite material may form a layer on a surface of the negative electrode current collector. The layer made of the negative electrode composite material may have a thickness not smaller than 10 μm and not greater than 200 μm, for example.

The negative electrode composite material includes at least a first silicon oxide material, a second silicon oxide material, CMC, and SBR. The negative electrode composite material may consist essentially of these materials. The negative electrode composite material may further include a conductive material, an additional negative electrode active material, and the like in addition to these materials. Each material is described above in detail. The negative electrode composite material according to the present embodiment includes both the first silicon oxide material (undoped $SiO_x$) and the second silicon oxide material (Li-doped $SiO_x$). With this configuration, battery 100 may have a high initial capacity.

The first silicon oxide material may include no $Li_2Si_2O_5$ phase, and the second silicon oxide material may include a $Li_2Si_2O_5$ phase.

The ratio of the second silicon oxide material to the total of the first silicon oxide material and the second silicon oxide material may be not lower than 10 mass % and not higher than 90 mass %, for example. The ratio of the second silicon oxide material to the total of the first silicon oxide material and the second silicon oxide material may be not lower than 10 mass % and not higher than 50 mass %, for example. This may increase initial capacity and improve cycling performance.

The presence of CMC and SBR in the negative electrode composite material may be checked by gas chromatography-mass spectrometry (GC-MS), for example. CMC may give a peak at a mass-to-charge ratio (m/z) of 177 (m/z=177) to a mass spectrum of the negative electrode composite material. SBR may give a peak at m/z=54 and a peak at m/z=122 to a mass spectrum of the negative electrode composite material.

(TG Curve)

Figure 3:
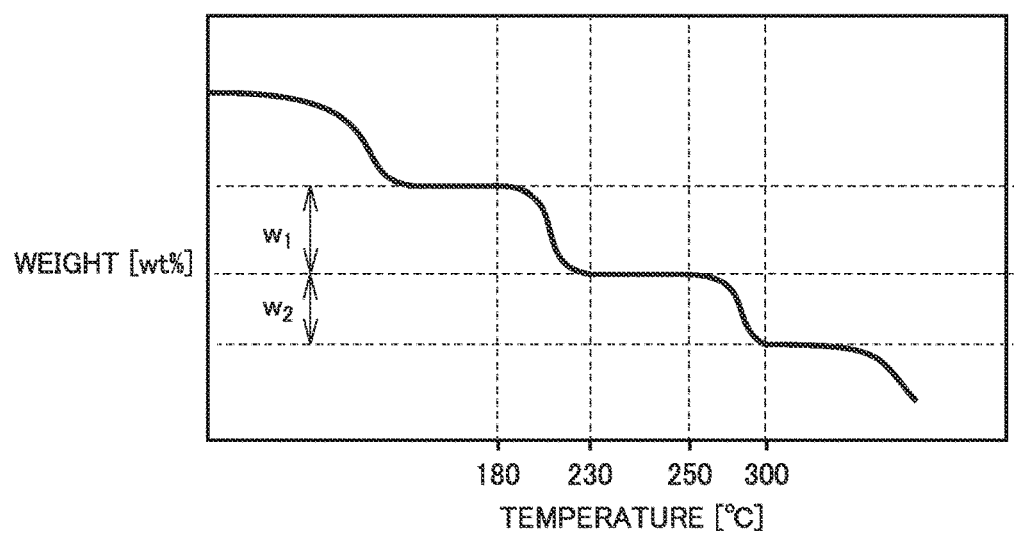
FIG. 3 illustrates a TG curve attributed to a negative electrode composite material.

FIG. 3 illustrates a TG curve attributed to a negative electrode composite material.

The TG curve attributed to the negative electrode composite material according to the present embodiment satisfies the relation expressed by the following expression (I):

$$w_2/(w_1+w_2) \geq 0.9 \qquad (I)$$

where $w_1$ denotes a weight decrement on the TG curve across a range of 180° C. to 230° C. and $w_2$ denotes a weight decrement on the TG curve across a range of 250° C. to 300° C.

In the negative electrode composite material according to the present embodiment, formation of alkali-modified CMC is mitigated. Because formation of alkali-modified CMC is thus mitigated, SBR may exhibit a desired level of binding force and a decrease in cycling performance may be mitigated.

The left side of the above expression (I), namely $w_2/(w_1+w_2)$, may represent the proportion of unmodified CMC in the total CMC in the negative electrode composite material. In the configuration in which the left side of the above expression (I), namely $w_2/(w_1+w_2)$, is 0.9 or greater, a decrease in cycling performance may be mitigated.

The left side of the above expression (I), namely $w_2/(w_1+w_2)$, may be 0.92 or greater, for example. With this, cycling performance may be improved. The left side of the above expression (I), namely $w_2/(w_1+w_2)$, may be 1 or smaller, for example. The left side of the above expression (I), namely $w_2/(w_1+w_2)$, may be 0.96 or smaller, for example.

It is desirable that a TG measurement sample (negative electrode composite material) collected from battery 100 be rinsed with dimethyl carbonate (DMC), ethyl methyl carbonate (EMC), and/or the like for pretreatment. The TG curve may be obtained with a typical TG apparatus. The TG apparatus may be a thermogravimetry-differential thermal analysis (TG-DTA) apparatus capable of simultaneously conducting thermogravimetric measurement and differential thermal measurement. At least three TG curves are obtained.

Each of $w_1$ and $w_2$ is the arithmetic mean obtained from these at least three TG curves.

The TG measurement conditions may be as follows, for example:

Measurement range: room temperature to 1000° C.
Temperature raising rate: 10° C./min
Measurement atmosphere: Ar <<Positive Electrode>>

Positive electrode 10 is in sheet form. Positive electrode 10 includes a positive electrode current collector and a positive electrode composite material. The positive electrode current collector may be an Al foil, for example. The positive electrode current collector may have a thickness not smaller than 5 µm and not greater than 50 µm, for example.

A positive electrode composite material is disposed on a surface of the positive electrode current collector. The positive electrode composite material may be disposed on one side of the positive electrode current collector. The positive electrode composite material may be disposed on both sides of the positive electrode current collector. The positive electrode composite material may form a layer on a surface of the positive electrode current collector. The layer made of the positive electrode composite material may have a thickness not smaller than 10 µm and not greater than 200 µm, for example. The positive electrode composite material includes at least a positive electrode active material. The positive electrode composite material may further include a conductive material, a binder, and the like in addition to the positive electrode active material.

The positive electrode active material may be in powder form, for example. The positive electrode active material may have a D50 not lower than 1 µm and not higher than 30 µm, for example. The positive electrode active material is not particularly limited. The positive electrode active material may be lithium cobalt oxide ($LiCoO_2$), lithium nickel oxide ($LiNiO_2$), lithium manganese oxide (such as $LiMnO_2$ and $LiMn_2O_4$), lithium nickel cobalt manganese oxide (such as $LiNi_{1/3}Co_{1/3}Mn_{1/3}O_2$ and $LiNi_{0.5}Co_{0.2}Mn_{0.3}O_2$), lithium nickel cobalt aluminate (such as $LiNi_{0.82}Co_{0.15}Al_{0.03}O_2$), and/or lithium iron phosphate ($LiFePO_4$), for example. The positive electrode composite material may include only one type of the positive electrode active material. The positive electrode composite material may include two or more types of the positive electrode active material in combination.

The conductive material is not particularly limited. For example, the conductive material may be a material described above as an example of the conductive material that may be included in the negative electrode composite material. The amount of the conductive material may be, for example, not lower than 0.1 part by mass and not higher than 10 parts by mass relative to 100 parts by mass of the positive electrode active material. The binder is not particularly limited. The binder may be polyvinylidene difluoride (PVdF), for example. The amount of the binder may be, for example, not lower than 0.1 part by mass and not higher than 10 parts by mass relative to 100 parts by mass of the positive electrode active material.

<<Separator>>

Separator 30 is electrically insulating. Separator 30 is interposed between positive electrode 10 and negative electrode 20. Separator 30 separates positive electrode 10 from negative electrode 20. Separator 30 is a porous film. Separator 30 allows the electrolyte solution to pass therethrough. Separator 30 may have a thickness not smaller than 10 µm and not greater than 30 µm, for example. Separator 30 may be a porous polyolefin film, for example.

Separator 30 may have a monolayer structure. Separator 30 may consist of a porous polyethylene (PE) film, for example. Separator 30 may have a multilayer structure. Separator 30 may be formed by stacking a porous polypropylene (PP) film, a porous PE film, and a porous PP film in this order, for example. On a surface of separator 30, a heat-resistant film may be formed. The heat-resistant film is also porous. The heat-resistant film contains a heat-resistant material. The heat-resistant material may be boehmite, silica, and/or titania, for example.

<<Electrolyte Solution>>

The electrolyte solution contains at least a Li salt and a solvent. The Li salt is dissolved in the solvent. The concentration of the Li salt may be not lower than 0.5 mol/L and not higher than 2 mol/L (not lower than 0.5 M and not higher than 2 M), for example. The Li salt may be $LiPF_6$, $LiBF_4$, $LiN(FSO_2)_2$, and/or $LiN(CF_3SO_2)_2$, for example. The electrolyte solution may contain only one type of the Li salt. The electrolyte solution may contain two or more types of the Li salt.

The solvent is aprotic. The solvent may be a mixture of a cyclic carbonate and a chain carbonate, for example. The mixing ratio may be, for example:

(cyclic carbonate):(chain carbonate)=1:9 to 5:5 (volume ratio).

The cyclic carbonate may be ethylene carbonate (EC), propylene carbonate (PC), butylene carbonate (BC), and/or fluoroethylene carbonate (FEC), for example. The solvent may contain only one type of the cyclic carbonate. The solvent may contain two or more types of the cyclic carbonate in combination.

The chain carbonate may be DMC, EMC, and/or diethyl carbonate (DEC), for example. The solvent may contain only one type of the chain carbonate. The solvent may contain two or more types of the chain carbonate in combination.

The solvent may contain a lactone, a cyclic ether, a chain ether, and a carboxylate ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylate ester may be methyl formate (MF), methyl acetate (MA), and/or methyl propionate (MP), for example.

The electrolyte solution may further contain various additives in addition to the Li salt and the solvent. The electrolyte solution may contain the additives in an amount not lower than 0.005 mol/L and not higher than 0.5 mol/L, for example. Examples of the additives may include a gas generation agent (also called "anti-overcharging additive"), a solid electrolyte interface (SEI) film-forming agent, and a flame retardant.

The gas generation agent may be cyclohexylbenzene (CHB) and/or biphenyl (BP), for example. The SEI-film-forming agent may be vinylene carbonate (VC), vinylethylene carbonate (VEC), $LiB(C_2O_4)_2$, $LiPO_2F_2$, propane sultone (PS), and/or ethylene sulfite (ES), for example. The flame retardant may be a phosphoric acid ester and/or a phosphazene, for example.

EXAMPLES

Next, examples according to the present disclosure are described. The description below does not limit the scope of claims.

Example 1

<<(a) Preparing Silicon Oxide Material>>

As a first silicon oxide material, undoped SiO powder was prepared. The term "SiO" refers to $SiO_x$ in which x=1 (see the above formula (II)).

As a Li material, LiH powder was prepared. The LiH powder was mixed with the undoped SiO powder and thus a mixture was prepared. In an Ar atmosphere, the resulting mixture was heated at 1000° C. for 60 minutes. By this, the undoped SiO was pre-doped with Li; in other words, Li-doped SiO was produced. The Li-doped SiO was rinsed with hydrochloric acid. After rinsing, the Li-doped SiO was dried. Thus, a second silicon oxide material was prepared.

Next, according to the procedure specified in "(*1) Procedure of preparing negative electrode composite material slurry" in Table 1 below, a negative electrode composite material slurry was prepared. Example 1 was carried out according to "Procedure (4)".

<<(b) Preparing Dispersion>>

Ion-exchanged water and CMC powder were prepared. The CMC powder was added to the ion-exchanged water. The ion-exchanged water was stirred, and thus the CMC powder was dissolved in the ion-exchanged water. In this way, an aqueous CMC solution was prepared.

As a conductive material, AB was prepared. The AB was dispersed in the aqueous CMC solution. Then, at "Timing 1" in "Procedure of preparing negative electrode composite material slurry" in Table 1 below, the first silicon oxide material (undoped SiO) was dispersed in the aqueous CMC solution. Thus, a dispersion was prepared. To the resulting dispersion, water was added. Thus, the dispersion was diluted.

<<(c) Preparing Negative Electrode Composite Material Slurry>>

At "Timing 2" in "Procedure of preparing negative electrode composite material slurry" in Table 1 below, the second silicon oxide material (Li-doped SiO) was dispersed in the dispersion.

As a binder, SBR was prepared. After the addition of the second silicon oxide material, SBR was dispersed in the dispersion. In other words, the second silicon oxide material and the binder were dispersed in the dispersion. Thus, a negative electrode composite material slurry was prepared. The resulting negative electrode composite material slurry had the following solid matter mixing ratio:

(first silicon oxide material):(second silicon oxide material):AB:CMC:SBR=10:90:5:1:5 (mass ratio).

<<(d) Producing Negative Electrode>>

The negative electrode composite material slurry was applied to a surface of a negative electrode current collector with a film applicator manufactured by Allgood. The negative electrode current collector was a Cu foil. The negative electrode composite material slurry was dried with a hot-air dryer. The drying was carried out at a temperature of 80° C. The drying duration was five minutes. Thus, a negative electrode composite material was disposed on a surface of the negative electrode current collector. In this way, negative electrode 20 was produced.

<Producing Battery>

Positive electrode 10 was prepared. As a positive electrode active material, lithium nickel cobalt manganese oxide was used. Separator 30 was prepared. Separator 30 was a porous PE film. Positive electrode 10, separator 30, negative electrode 20, and separator 30 were stacked in this order and then wound in a spiral fashion, and thus electrode array 40 was formed.

Casing 50 was prepared. Casing 50 was cylindrical. In casing 50, electrode array 40 was placed. Into casing 50, an electrolyte solution was injected. The electrolyte solution consisted of the components described below.

Li salt: $LiPF_6$ (concentration, 1 mol/L)

Solvent: [EC:DMC:EMC=3:4:3 (volume ratio)]

Casing 50 was hermetically sealed. Thus, battery 100 (a cylindrical non-aqueous electrolyte secondary battery) was produced. Battery 100 was designed to operate within a voltage range of 3.0 to 4.1 V.

Examples 2 and 3

Negative electrode 20 was produced in the same manner as in Example 1 except that the ratio of the second silicon oxide material to the total of the first silicon oxide material and the second silicon oxide material was changed as specified in Table 1 below. Then, battery 100 including negative electrode 20 was produced in the same manner as in Example 1.

Comparative Example 1

Comparative Example 1 was carried out according to "Procedure (1)" in "(*1) Procedure of preparing negative electrode composite material slurry" in Table 1 below. More specifically, at "Timing 1" in "Procedure of preparing negative electrode composite material slurry", undoped SiO was dispersed in the aqueous CMC solution; and then at "Timing 2", no material was added. Except these conditions, the same manner as in Example 1 was adopted to produce negative electrode 20. Then, battery 100 including negative electrode 20 was produced in the same manner as in Example 1.

Comparative Example 2

Comparative Example 2 was carried out according to "Procedure (2)" in "(*1) Procedure of preparing negative electrode composite material slurry" in Table 1 below. More specifically, at "Timing 1" in "Procedure of preparing negative electrode composite material slurry", Li-doped SiO was dispersed in the aqueous CMC solution; and then at "Timing 2", no material was added. Except these conditions, the same manner as in Example 1 was adopted to produce negative electrode 20. Then, battery 100 including negative electrode 20 was produced in the same manner as in Example 1.

Comparative Example 3

Comparative Example 3 was carried out according to "Procedure (3)" in "(*1) Procedure of preparing negative electrode composite material slurry" in Table 1 below. More specifically, at "Timing 1" in "Procedure of preparing negative electrode composite material slurry", undoped SiO and Li-doped SiO were simultaneously dispersed in the aqueous CMC solution; and then at "Timing 2", no material was added. Except these conditions, the same manner as in Example 1 was adopted to produce negative electrode 20. Then, battery 100 including negative electrode 20 was produced in the same manner as in Example 1.

Comparative Examples 4 and 5

Negative electrode 20 was produced in the same manner as in Comparative Example 3 except that the ratio of Li-doped SiO to the total of undoped SiO and Li-doped SiO was changed as specified in Table 1 below. Then, battery 100 including negative electrode 20 was produced in the same manner as in Comparative Example 3.

<Evaluation>

<<TG Curve>>

According to the measurement method described above, a TG curve was obtained. On the TG curve, $w_1$ and $w_2$ were read. The left side of the above expression (I), namely $w_2/(w_1+w_2)$, was calculated. Results are shown in Table 1 below.

<<Initial Capacity>>

The initial capacity (namely, initial discharge capacity) of battery 100 was measured in an environment at room temperature. The initial capacity is shown in Table 1 below. Each value in column "Initial capacity" in Table 1 below is expressed as a percentage; the value is obtained by dividing the initial capacity of each example by the initial capacity of Comparative Example 1 and then converting the resultant into percentage. The higher the value is, the greater the increase in initial capacity may have been.

<<Cycle Capacity Retention>>

In an environment at room temperature, 100 cycles of charge and discharge were carried out at a constant current of 2 C and a voltage within the range of 3.0 to 4.1 V. Then, cycle capacity retention was measured. The cycle capacity retention thus measured is shown in Table 1 below. The cycle capacity retention is expressed as a percentage; the value is obtained by dividing the discharged capacity measured after the 100th cycle by the discharged capacity measured after the first cycle. The higher the cycle capacity retention is, the greater the mitigation of a decrease in cycling performance may have been. At a current of 2 C, discharging battery 100 from its design capacity completes in 0.5 hour.

<Results>

Comparative Example 1 had a low initial capacity. It may be because the negative electrode composite material included no Li-doped SiO.

Comparative Example 2 experienced a great decrease in cycling performance. It is considered that Li-doped SiO and CMC may have come into contact with each other during preparation of the negative electrode composite material slurry and the resulting alkali-modified CMC may have interfered with the binding action of SBR.

Comparative Examples 3 to 5 also experienced a great decrease in cycling performance. In Comparative Examples 3 to 5, undoped SiO and Li-doped SiO were simultaneously dispersed in the aqueous CMC solution. As a result, Li-doped SiO and CMC may have come into contact with each other to produce alkali-modified CMC.

In Comparative Examples 2 to 5, Li-doped SiO may have caused formation of alkali-modified CMC. In Comparative Examples 2 to 5, the left side of the above expression (I), namely $w_2/(w_1+w_2)$, is lower than 0.9.

In Examples 1 to 3, initial capacity increased. It may be because undoped SiO and Li-doped SiO were used in combination.

In Examples 1 to 3, a decrease in cycling performance was mitigated. It is considered that because Li-doped SiO was dispersed in the aqueous CMC solution after undoped SiO was dispersed, contact between Li-doped SiO and CMC may have been mitigated.

In Examples 1 to 3, formation of alkali-modified CMC may have been mitigated. In Examples 1 to 3, the left side of the above expression (I), namely $w_2/(w_1+w_2)$, is 0.9 or higher.

In Examples 1 to 3, because the left side of the above expression (I), namely $w_2/(w_1+w_2)$, is 0.92 or higher, cycling performance tended to be improved.

TABLE 1

| | Negative electrode composite material | | | | | | Production method Procedure of preparing negative electrode composite material slurry(*1) | Evaluation | |
|---|---|---|---|---|---|---|---|---|---|
| | Composition | | | | | | | | |
| | First silicon oxide material (undoped) [mass %] | Second silicon oxide material (Li-doped) [mass %] | AB [mass %] | CMC [mass %] | SBR [mass %] | TG curve $w_2/(w_1 + w_2)$ [—] | | Initial capacity [%] | Cycle capacity retention [%] |
| Comp. Ex. 1 | 100 | 0 | 5 | 1 | 5 | 0.95 | Procedure (1) | 100 | 72 |
| Comp. Ex. 2 | 0 | 100 | 5 | 1 | 5 | 0.34 | Procedure (2) | 110 | 50 |
| Comp. Ex. 3 | 10 | 90 | 5 | 1 | 5 | 0.54 | Procedure (3) | 102 | 56 |
| Comp. Ex. 4 | 50 | 50 | 5 | 1 | 5 | 0.72 | Procedure (3) | 105 | 62 |
| Comp. Ex. 5 | 90 | 10 | 5 | 1 | 5 | 0.87 | Procedure (3) | 110 | 65 |
| Ex. 1 | 10 | 90 | 5 | 1 | 5 | 0.90 | Procedure (4) | 103 | 72 |
| Ex. 2 | 50 | 50 | 5 | 1 | 5 | 0.92 | Procedure (4) | 107 | 75 |
| Ex. 3 | 90 | 10 | 5 | 1 | 5 | 0.96 | Procedure (4) | 112 | 80 |

(*1)Procedure of preparing negative electrode composite material slurry

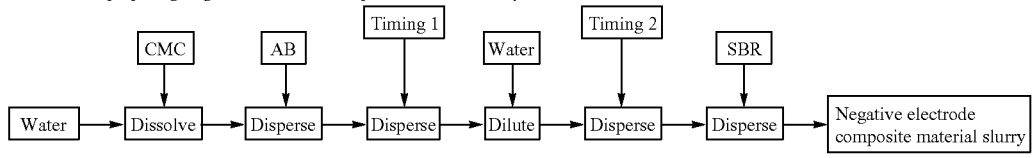

| | Procedure (1) | Procedure (2) | Procedure (3) | Procedure (4) |
|---|---|---|---|---|
| Timing 1 | undoped | Li-doped | undoped + Li-doped | undoped |
| Timing 2 | — | — | — | Li-doped |

In Examples 1 to 3, because the ratio of the second silicon oxide material to the total of the first silicon oxide material and the second silicon oxide material is not lower than 10 mass % and not higher than 50 mass %, initial capacity tended to be increased and cycling performance tended to be improved.

The embodiments and examples disclosed herein are illustrative and non-restrictive in any respect. The technical scope indicated by the claims is intended to include any modifications within the scope and meaning equivalent to the terms of the claims.

What is claimed is:

1. A method of producing a negative electrode for a non-aqueous electrolyte secondary battery, the method comprising:
    (a) preparing a first silicon oxide material and a second silicon oxide material;
    (b) preparing a dispersion by dispersing the first silicon oxide material in an aqueous carboxymethylcellulose solution;
    (c) preparing a negative electrode composite material slurry by dispersing the second silicon oxide material and a binder in the dispersion; and
    (d) producing a negative electrode by applying the negative electrode composite material slurry to a surface of a negative electrode current collector and then performing drying,
    the binder including no carboxymethylcellulose,
    the first silicon oxide material not having been pre-doped with lithium,
    the second silicon oxide material having been pre-doped with lithium.

2. The method of producing a negative electrode according to claim 1, wherein
    the first silicon oxide material includes no $Li_2Si_2O_5$ phase, and
    the second silicon oxide material includes a $Li_2Si_2O_5$ phase.

3. The method of producing a negative electrode according to claim 1, wherein the binder includes styrene-butadiene rubber.

4. The method of producing a negative electrode according to claim 1, wherein the mass of the second silicon oxide material to the total mass of the first silicon oxide material and the second silicon oxide material is not lower than 10 mass % and not higher than 50 mass %.

5. The method of producing a negative electrode according to claim 1, wherein
    a thermogravimetric curve attributed to the negative electrode composite material of the negative electrode composite material slurry satisfies a relation expressed by the following expression (I):

$$w_2/(w_1+w_2) \geq 0.9 \tag{I}$$

where $w_1$ denotes a weight decrement on the thermogravimetric curve across a range of 180° C. to 230° C. and $w_2$ denotes a weight decrement on the thermogravimetric curve across a range of 250° C. to 300° C.

* * * * *